United States Patent [19]

Viannay et al.

[11] Patent Number: 5,012,980
[45] Date of Patent: May 7, 1991

[54] LINEAR-SPRAYING DEVICE

[75] Inventors: Stéphane G. J. Viannay, Voisin-le-Bretonneux; Bernard M. Roth, Boulogne-Billancourt; Solange M. V. Mirigay, Chaville; Georges J. B. Chastang, Coignieres, all of France

[73] Assignee: Bertin & Cie, Plaisir-Cedex, France

[21] Appl. No.: 836,644

[22] Filed: Mar. 5, 1986

[30] Foreign Application Priority Data

Mar. 6, 1985 [FR] France ............................. 85 03280

[51] Int. Cl.$^5$ ............................................. B05B 7/00
[52] U.S. Cl. .................................. 239/423; 239/543; 239/568
[58] Field of Search ............... 239/296, 297, 300, 299, 239/77, 423, 424, 424.5, 549, 568, 543

[56] References Cited

U.S. PATENT DOCUMENTS

| 593,013 | 11/1897 | Fisher | 239/423 |
| 1,793,897 | 2/1931 | Barnes | 239/423 |
| 2,813,754 | 11/1957 | Zielinski | 239/549 |
| 3,687,368 | 8/1972 | Geberth et al. | 239/300 |
| 4,066,117 | 1/1978 | Clark et al. | 239/296 |
| 4,236,674 | 12/1980 | Dixon | 239/424 |
| 4,283,012 | 8/1981 | Hanson | 239/424 |

FOREIGN PATENT DOCUMENTS 1577859 8/1969 Fed. Rep. of Germany ...... 239/423

Primary Examiner—Andres Kashniko
Assistant Examiner—Michael J. Forman
Attorney, Agent, or Firm—Breiner & Breiner

[57] ABSTRACT

The pressurized gas is supplied by two sleeves separated by a sprayer device forming a funnel. The narrow end of the funnel has a spraying head with, in the plane of symmetry (P) of the device, at least one slot through which the liquid flows. The pressurized gas passes through a series of openings provided on either side of the slot. A liquid supply tube is arranged parallel in relation to the wide end of the funnel and has openings through which the liquid flows directly or indirectly into the funnel and passes through the slot without any appreciable pressure.

9 Claims, 3 Drawing Sheets

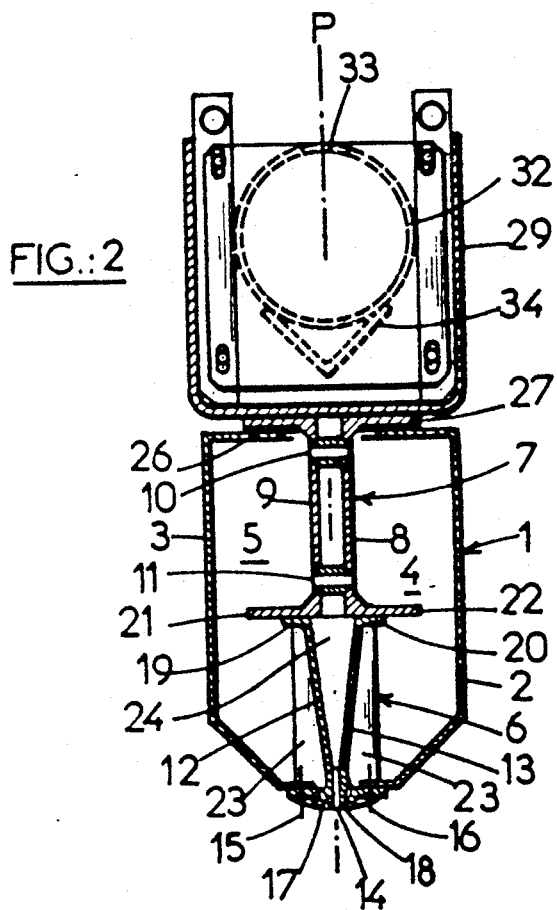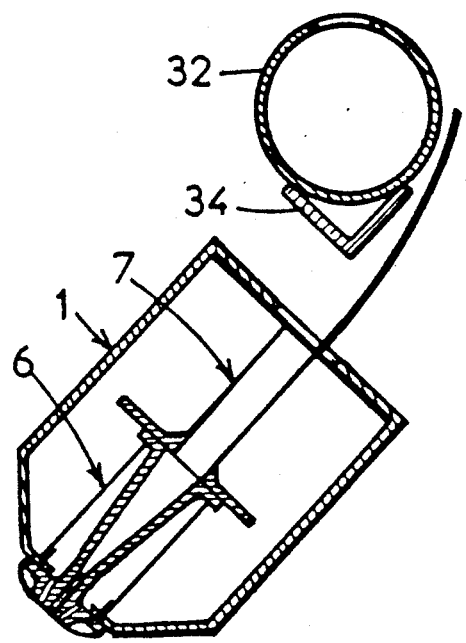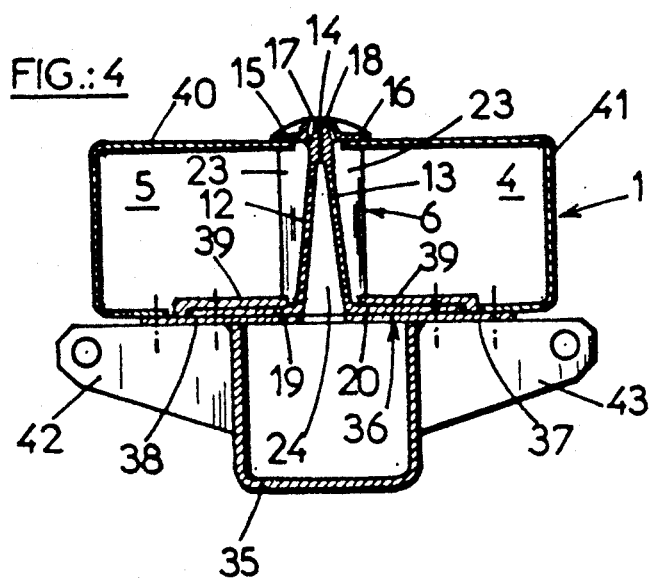

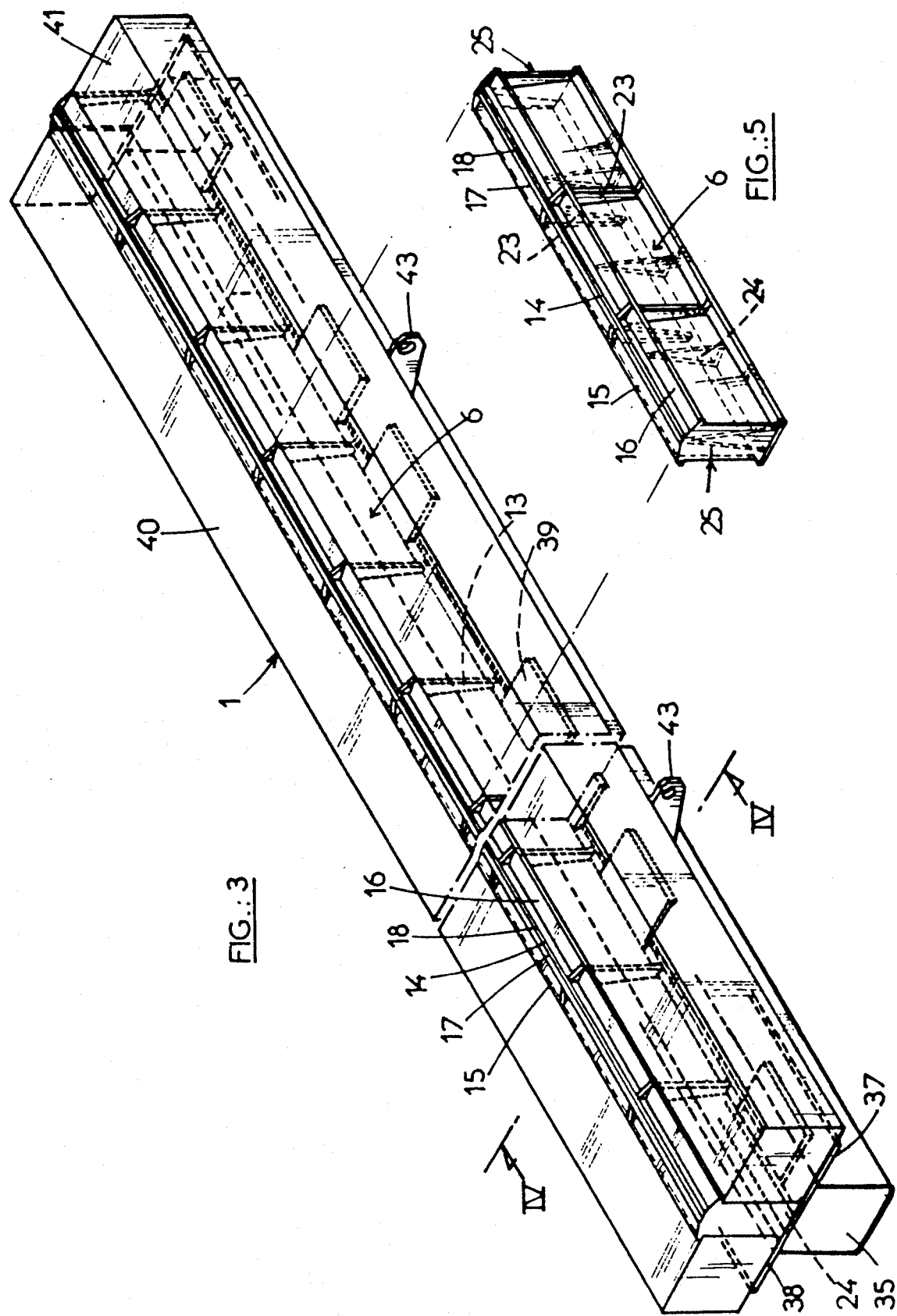

LINEAR-SPRAYING DEVICE

The invention relates to a linear-spraying device comprising a hollow body which is supplied with pressurised gas and inside which a liquid supply duct is arranged, which duct emerges, longitudinally, with at least one opening between two rows of orifices or slots through which the pressurised gas passes.

A spraying device forming a substantially continuous screen of droplets is known from French Patent No. 2,288,068 (BOUSSOIS). A pressurised gas ensures atomisation of a liquid which is introduced via a first slot at the top of a spraying chamber into which gas supply orifices lead at the bottom.

The gas/liquid mixture passes into a second open spraying slot opposite the surface to be treated. According to the embodiment shown, the device consists of two U-shaped parts assembled by means of their transverse arms. The water supply channel and the first slot are obtained, by means of machining, in the rear of the transverse arm of each pair of a half-section.

The opening of the U-shaped parts is closed by a sealing plate so as to form longitudinal chambers into which the pressurised gas is supplied. Slanting channels pass through the flanges of the U so as to convey the pressurised gas into the spraying chamber The width of the first liquid supply slot is adjusted by inserting wedges between the transverse arms of the two sections.

A two-dimensional jet sprayer is also known from French Patent No. 2,375,911, which sprayer consists of a hollow body which has a longitudinal slot supplied with pressurised gas and, arranged inside the said hollow body, a liquid-injection bar provided with orifices of a predetermined diameter.

The throughput of the sprayer can be altered only within very narrow limits by adjusting the pressure at which the liquid is injected into the spraying chamber or into the hollow body. A considerable variation in the throughput of the sprayers described can only be obtained by changing the play of the wedges, which determines the width of the liquid inlet slot, or by changing the injectors of the injection bar. These operations can only be carried out by stopping the machine and disassembling more or less all of the spraying devices.

Other drawbacks of known devices become apparent, when the latter are used for low throughputs which require narrow slots or orifices. These drawbacks include, in particular, clogging due either to the deposition of certain particles dissolved in the liquid or to the accumulation of impurities which are larger in size than the slot or the orifice. The resultant reduction in throughput cannot be adequately offset by the injection pressure of the liquid and requires relatively frequent disassembly and cleaning of the apparatus.

The invention proposes a spraying device which allows the throughput to be varied considerably without having to either stop the machine or disassemble the devices, the liquid throughput being limited only by the supply ducts of the water supply bar.

The device according to the invention is distinguished in that hollow body consists of two sleeves separated by at least one spraying device forming a funnel, the narrow end of the funnel having a spraying head directed towards the surface of the part to be treated, the said head having in the plane of symmetry of the device at least one slot through which the liquid is able to flow, and, on either side of the said slot, a row of openings or a slot through which the pressurised gas is able to pass, and in that a liquid supply tube, which is arranged parallel in relation to the wide end of the funnel, has, in the plane of symmetry of the device, openings through which the liquid is able to flow directly or indirectly into the funnel.

Advantageously, the width of the liquid supply slot is such that the liquid flow does not require any appreciable pressure, and preferably the width of the gas supply slots or opening is also such that the gas required for spraying is supplied at a low pressure upstream of the slots or openings.

Therefore, the width of the liquid supply slot can be of the same order of magnitude as that of the gas supply slots (approximately 2 to 3 times larger, for example).

The explanations and figures provided below by way of example will make it possible to understand how the invention can be achieved.

FIG. 2 is a partially sectioned view in the direction of the arrow F shown in FIG. 1.

FIG. 3 is a perspective view of an example of embodiment of a spraying device with the jet pointing upwards.

FIG 4 is a sectional view along the lines IV—IV shown in FIG. 3.

FIG. 5 is a perspective view of a spraying element.

FIG. 6 is a diagrammatic view of another example of embodiment of a sprayer.

FIG. 1 shows a spraying device according to an embodiment of the invention. This device is more particularly intended to produce a laminar jet directed downwards.

Figure 1:
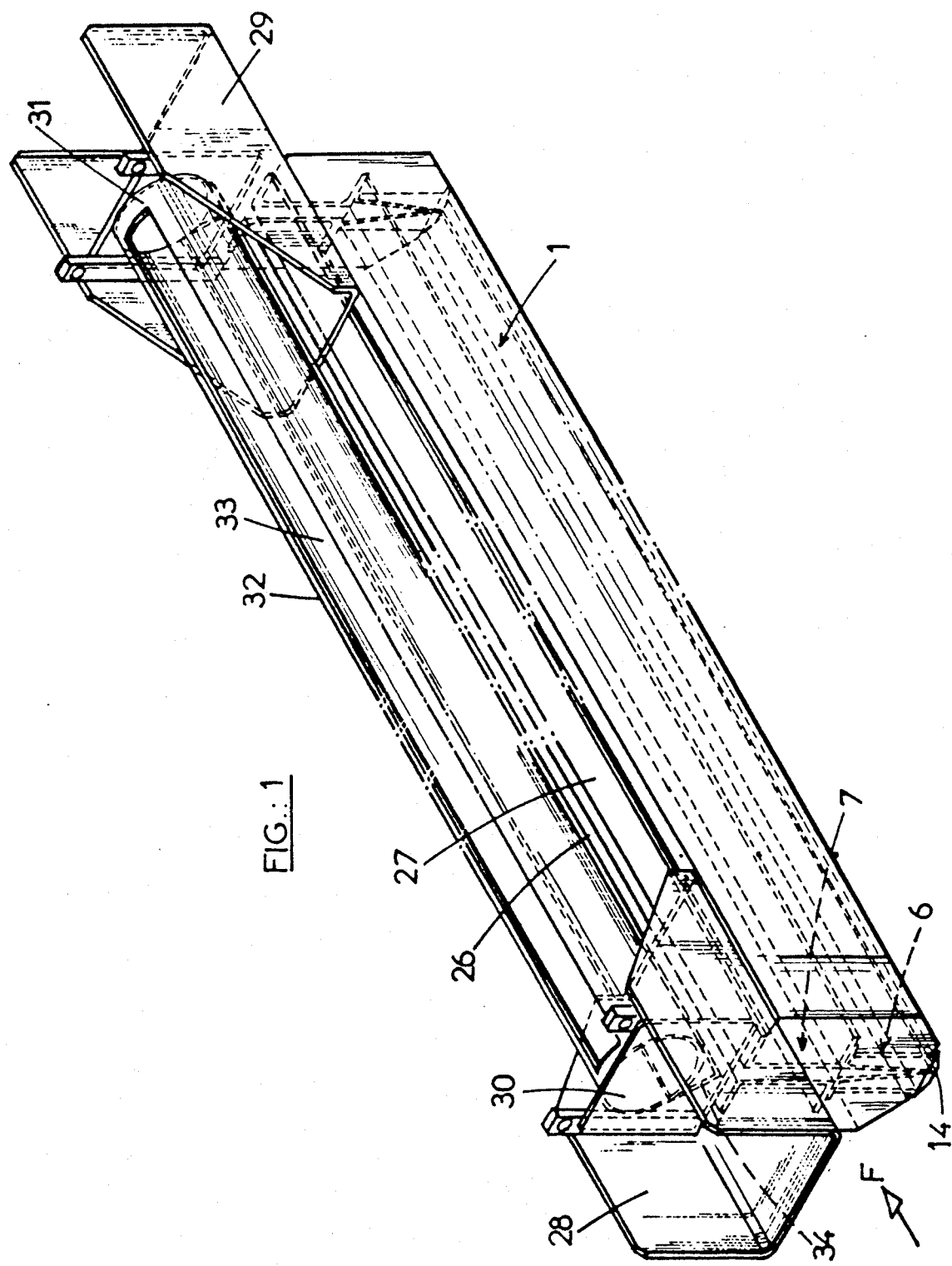
FIG. 1 shows a perspective view of an example of embodiment of a spraying device with the jet pointing downwards.

The spraying device (FIGS. 1 and 2) comprises a hollow body 1 consisting of two cases 2, 3 defining two sleeves 4, 5 supplied with pressurised gas at one of their ends. These two sleeves surround a sprayer device 6 and a liquid supply duct 7.

The liquid supply duct 7 consists, in the embodiment shown, of two-sections 8, 9 which are fixed back to back by means of ties 10, 11, leaving a passage which is large in width. The lower flanges of the section support the sprayer device 6 consisting of elements such as those shown in FIG. 5. These elements consist, for example, of moulded parts. The converging side walls 12, 13 form a funnel, the narrow part of which has a continuous or discontinuous slot 14 which is relatively large in width (of the order of 5 mm). Each edge of the slot 14 is provided, on the outside, with a lip 15, 16 substantially perpendicular to the longitudinal plane of symmetry P. The lips 15, 16 are perforated on either side by openings 17, 18, the axes of which point obliquely towards the plane of symmetry P and converge at external points which are located in front of the slot 14 and are aligned in a straight line parallel to the outlet of the slot. These openings occur in the form of two rows of holes or slots which are arranged, for example, symmetrically in relation to the axis of the slot 14 and are intended to direct the spraying gas onto the liquid flowing from the slot 14.

The slot 14 and the rows of openings form a spraying head directed towards the surface of the part to be treated.

The size of the opening and their angle of inclination depend on the width of the jet which is required and consequently on the width of the surface which is to be treated. This width, moreover, is also dependent on the distance between the surface and the source of the jet. In a known manner, it is possible to obtain a jet which is off-centre in relation to the plane of symmetry of the device by providing the rows of openings with different angles of inclination.

The edges of the wide part of the funnel or inlet are provided, on the outside, with fixing lugs 19, 20 which are approximately perpendicular to the plane of symmetry P and which co-operate in fixing the sprayer element 6 in a leakproof manner to the lower flanges 21, 22 of the liquid supply duct 7.

The rigidity of the sprayer element is ensured by strengthening pieces 23 and 24 which are perpendicular to the plane of symmetry P and are provided on the outside of the funnel, on the external surfaces, and extend approximately between the lips 15, 16 and the fixing lugs 19, 20, and on the inside, between the internal surfaces of the funnel. The ends 25 of an element (FIG. 5) are sealed off by the said strengthening pieces which form the assembly plates of the various elements forming the sprayer device.

The hollow body 1 is formed around the sprayer device and the liquid supply duct by fixing in a leakproof manner the cases, 2, 3 both to the upper flanges 26, 27 of the sections forming the duct 7 and to the lips 15, 16 of the sprayer device.

The assembly consisting of the sleeves and the sprayer device is held at its ends (FIG. 1) by support pieces 28, 29 which have, in their top part, openings 30, 31 in which the ends of a liquid supply tube 32 are fixed. The axis of the tube is in the plane of symmetry P of the liquid sypply duct and funnel assembly arranged in the lower part.

The liquid supply tube 32 has, along its upper generatrix, openings or a longitudinal slot 33 of relatively large width so as to allow the liquid, which is introduced at at least one of the said tube, to flow over and to flow, uniformly, along the wall of the tube so as to fall to the lowest point in the liquid supply duct 7 and from there, along the walls of the funnel through the slot 14 where it meets the pressurised-gas jets emerging from the openings 17, 18. The liquid therefore supplies the sprayer 6 by means of gravity. As a result of the openings or slot 33 being relatively wide, the liquid is distributed by overflowing and the throughput can consequently be varied by very large amounts. It is obvious the the maximum throughput is the maximum amount of liquid which the supply duct 7 can allow to flow.

The liquid trickles down the internal walls of the funnel. Advantageously, the width of the slot 14 is such that no liquid is retained; immediate stoppage of spraying is therefore obtained when the supply of the liquid supply tube 32 is interrupted, for example by operating a supply vlave (not shown).

The gas, which is emitted under pressure from the orifices or slots 17, 18, produces a suction effect on the liquid flowing from the slot 14, this effect being all the more great, the greater the speed of the jets and consequently the greater the pressure of the gas in the sleeves 4, 5. This sucking action will have the effect of increasing slightly the maximum throughput of the liquid supply duct and will thus allow it to be supplied with a throughput from the water supply tube 32 greater than that which would normally be accepted without suction.

In order to prevent separation of the sheet of water from the walls of the supply tube, mainly in the vicinity of the cylindrical zone opposite the overflow zone, a guide 34 is provided which forms, on the lower surface, a developing profile in the form of a dihedron, the edge of which is arranged in the vertical plane of symmetry P.

As a result of the arrangement of the openings or of the slot along the upper generatrix of the liquid supply tube, it is possible to vary the throughput by totally or partially blocking one or more parts of the slot. The laminar jet obtained at the sprayer outlet will therefore have a variable flow rate along its length, according to the throughput of the corresponding part of the liquid supply tube.

The sprayer may be inclined so as to ensure spraying in directions ranging from the vertical direction, form the top downwards, to the horizontal direction. A channel may be used to guide the liquid from the liquid supply tube into the funnel (FIG. 6). FIG. 2 shows a spraying device with the jet pointing upwards. The design of this device involves a few variations in the arrangement of the various elements.

The sprayer elements 6 forming a funnel are similar in all respects to those described in the previous device and will not be described below.

The liquid supply tube 35 consists of a rectangular section, one of the sides 36 of which is extended longitudinally and in its plane by two flanges 37, 38. This same side has, in the middle, a slot orifices of relatively large width. The side 36 and the flanges 37, 38 support the sprayer elements 6, the fixing lugs 19, 20 of which are held in position by support lugs 39.

Preferably, each element 6 is held at its ends and on each side by support lugs 39 which allow free expansion of the element which, under certain conditions of use, is subjected to relatively high temperatures.

As in the example of the device described above, two cases 40, 41 are fixed, on the one hand, to the flanges 37, 38 and, on the other hand, to the lips 15, 16 of the sprayer element, so as to form two sleeves 5, 4 which are supplied with compressed gas.

The spraying device forms a bar which is supported, at least at its ends, by right-angle brackets 42, 43 which are welded to the liquid supply tube 35 and to the flanges 19, 20.

The mode of operation of the device with the jet pointing upwards is similar to that of the device described above.

The liquid filling the supply tube 35 is subjected to a slight pressure until it fills the funnel of the sprayer 6 entirely and flows out at the spraying slot outlet. The jets of pressurised gas emitted form the orifices or slots 17, 18 transport the liquid and atomises it. The jets of gas create a sucking effect which prevents the liquid leaving the slot 14 flowing under the action of gravity. The liquid is supplied to the spraying outlet under a very slight pressure, in accordance with the height of the liquid contained in the funnnel.

The sprayer may be inclined so as to ensure spraying in directions ranging from the vertical direction, from the bottom upwards, to the horizontal direction.

The spraying devices according to the invention have numerous advantages, some of which are as follows:
  uniform distribution of liquid along the entire length of the device;
  low-pressure liquid supply;

large width of the water inlet slot, thereby avoiding clogging;

separation of the liquid supply circuit from the gas circuit at least as far as the device with an upwards pointing jet is concerned, allowing, if necessary, adjustment of the liquid circuit without disassembling the gas circuit;

interchangeability of the sprayer elements and the provision of devices of modular length;

elements made from a material adapted to their use.

Such devices are used, for example, in a system for the heat treatment of metal sheets, comprising spraying devices with jets pointing downwards and upwards, by means of which symmetrical treatment of the metal sheets can be achieved with precise adjustment of the cooling conditions, the metal sheet passing between two or more devices.

On account of the heat conditions to which the spraying devices are subjected, in order to ensure good stability the elements must be made from a material which is resistant to high temperatures, such as cast iron.

We claim:

1. Linear spraying device comprising
an elongated hollow body comprising two elongated sleeves and including means for supplying said sleeves with a gas;
a sprayer separating said two elongated sleeves, said sprayer forming an elongated funnel having a wide and narrow part, said sprayer presenting a plane of longitudinal symmetry, which intersects said wide and narrow parts, the narrow part of the funnel including a spraying head which presents in the said plane of symmetry, at least a liquid supply slot through which a liquid is able to flow, and on either side of the liquid supply slot a gas supply slot through which the gas from said elongated sleeves is able to pass through;
a liquid supply tube, having a longitudinal slot which is arranged parallel to the plane of longitudinal symmetry, said liquid supply tube being in communication with the wide part of the funnel through which the liquid flows through to reach the slot of the said sprayer device.

2. Device according to claim 1 wherein the gas supply slots have a width of the same order of magnitude as that of the liquid supply slot.

3. Spraying device according to claim 1 wherein said spraying head provides a downwards pointing jet with the wide part of said funnel being directed upwards, the liquid supply tube being arranged horizontally and parallel at a distance from the wide part of the funnel, the axis of the tube being in the plane of longitudinal symmetry of the device, and in that the slots through which liquid flows are provided along an upper generatrix of the tube, whereby the liquid trickles down through the funnel.

4. Device according to claim 3 wherein the width of the liquid supply slot is dimesioned so that no liquid is retained, whereby spraying stops almost immediately when the supply of the liquid supply tube is interrupted.

5. Device according to claim 1 wherein the device is inclined so as to ensure spraying of the surface of a component being sprayed in directions ranging from the vertical direction from the top downwards, to the horizontal direction, a channel being provided in order to guide the liquid from the liquid supply tube into the funnel.

6. Device according to claim 1 wherein the liquid supply tube has a guide along a lower generatrix with an edge arranged in the plane of longitudinal symmetry of the device.

7. Device according to claim 1 wherein the liquid supply tube is fixed to the wide part of the funnel.

8. Spraying device according to claim 1 wherein said spraying head provides an upwards pointing jet with the wide part of the funnel being directed downwards.

9. Device according to claim 1 wherein the spraying device is inclined so as to ensure spraying of the surface of the component in directions ranging from the vertical direction to the horizontal direction.

* * * * *